United States Patent [19]

Cummings

[11] Patent Number: 4,637,629
[45] Date of Patent: Jan. 20, 1987

[54] NON-ENCUMBERING TORSO RESTRAINT SYSTEM

[75] Inventor: Robert J. Cummings, Hermosa Beach, Calif.

[73] Assignee: Rockwell International Corporation, El Segundo, Calif.

[21] Appl. No.: 761,285

[22] Filed: Aug. 1, 1985

[51] Int. Cl.$^4$ .................. B64D 25/06; B60R 21/10
[52] U.S. Cl. ...................... 280/801; 244/151 R; 297/464
[58] Field of Search ............ 280/801, 808; 297/464; 244/151 R

[56] References Cited

U.S. PATENT DOCUMENTS

4,441,738 4/1984 Tsuge et al. .................. 280/806
4,488,691 12/1984 Lorch ........................... 280/801

Primary Examiner—Richard A. Bertsch
Attorney, Agent, or Firm—Charles T. Silberberg; Chris Papageorge

[57] ABSTRACT

A pair of crisscrossing straps and a pair of tension straps connect the two ends of a rigid U-shaped member to the two sides of the backrest of an aircraft crewmember's seat. The end portions of the U-shaped member have slip rings which are the support points for a pair of support straps which form loops encircling the crewmember's rib cage. The support straps can move through the slip rings thereby allowing the crewmember the ability to turn to either side while secured to the seat by the restraint system. In another embodiment of the invention, the crisscrossing straps are eliminated and a pair of wedge shaped support pads mounted on the front surface of the backrest of the seat are used instead of a U-shaped member. The tension straps and the crisscross straps are connected to inertial reels mounted at the sides of the backrest of the seat in order to provide restraint to each side of the support strap system.

20 Claims, 10 Drawing Figures

NON-ENCUMBERING TORSO RESTRAINT SYSTEM

BACKGROUND OF THE INVENTION

The invention essentially is a torso restraint system that provides an aircraft crewmember protection particularly against severe lateral forces as well as forward and backward forces while also allowing the crewmember to turn left or right and to bend forward or backwards in the seat during normal flight conditions.

Modern high performance fighter aircraft are capable of rapid roll accelerations as well as sophisticated flight maneuvers including direct side force. Severe stresses are placed on the pilot by such aircraft maneuvers. Frequently, modern aircraft are capable of aerial maneuvers which are beyond the tolerance of the human pilot. Consequently, many fighter aircraft and their pilots are lost as a result of pilot blackout.

Although there are a variety of restraint systems for pilots currently available, these restraint systems typically do not adequately address the problem of torso restraint from forces acting in a lateral direction with respect to the aircraft seat. Typically, prior art systems are designed to protect the pilot from acceleration or deceleration forces acting primarily in the forward or backward directions with respect to the aircraft seat.

Some pilot restraint systems incorporate straps which cross over the pilot's chest. In such prior art systems, the straps which are positioned across the pilot's chest are anchored to the sides of the seat. Since many pilot seats are wider than the torso of the pilot, the straps do not make full contact with the lateral portions of the pilot's torso. Thus, the straps still allow lateral movement of the pilot relative to the seat. Thus, the pilot's torso is allowed to build up speed (relative to the cockpit) between the straps during maneuvers before coming to the point where the straps or the sides of the cockpit restrain the torso from further lateral movement. Moreover, since the lateral straps allow some limited lateral movement of the torso, the sudden shock of the torso coming up against the straps and being abruptly decelerated thereby may also result in fatigue, bruising or some other injury to the pilot's torso. It must also be noted that in such a prior art restraint system, the chest straps do not make full contact with the sides of the pilot's torso because they are anchored to the seat at locations which are relatively far from the pilot's torso.

Some types of prior art pilot restraint systems use a chest strap which encircles the rib cage of the pilot. Such systems typically have the strap anchored to the seat at one point directly behind the center portion of the torso. Such prior art systems are used primarily to retain the pilot in a certain position relative to the seat. In such systems the attachment point of the strap to the seat may be a hook or latch which restrains forward movement of the pilot's torso and which may also prevent the pilot's back from coming against the seat back during periods of hard acceleration. Such systems thus are relatively ineffective in protecting the pilot from forces of acceleration in the forward and lateral directions. Moreover, the pilot's ability to turn in the seat is seriously limited; since the straps are connected at one point behind the seat, the loop formed by the straps may swing about this point; however, it must also be noted that the pilot must swing within this limited range of movement in order for the straps to be able to restrain further lateral movement of the pilot. Consequently, since this system allows the pilot's torso to accelerate to a significant velocity during such swinging movements before being abruptly stopped, lateral forces may wrench the pilot's torso in a lateral direction. Thus, although this system allows the pilot to turn in the seat, it also allows the pilot's torso to swing laterally as a result of lateral forces of acceleration or deceleration. Therefore, reduction of the pilot's ability to turn in the seat is required in order to improve the system's ability to provide restraint against such lateral forces. Otherwise, lateral forces induced by aircraft maneuvers can result in violent lateral swinging of the pilot's body. Consequently, with this prior art system, the pilot's torso may become bruised or sustain other type of internal injury.

Other prior art systems require that the pilot be up against the back of the seat in order for restraint to be effective. Such prior art systems are directed to securing the pilot firmly against the seat; in any other position, the pilot may not be adequately protected from forces of acceleration or deceleration. As with other prior art systems discussed hereinabove, this prior art system typically may also provide lateral chest restraints which are anchored to the sides of the seat back. Thus, the straps used to restrain the pilot from lateral forces do not make full contact with the lateral torso of the pilot. As previously mentioned hereinabove with reference to other prior art systems, this lack of full contact allows lateral forces of acceleration or deceleration to move the pilot's torso up against the lateral strap. Such movement of the pilot within the restraint system can result in fatigue, bruising or serious internal injuries to the pilot. Moreover, because the pilot must be secured firmly to the seat in order for the restraining action to be effective, the pilot's movements are severely restricted. The pilot is not typically able to turn or bend over without releasing this type of prior art system. Thus, this prior art device has the disadvantage that it severely hampers the pilot's movements.

Other prior art systems may use inflatable bladders positioned at various points on the pilot's body to restrain the pilot and absorb the forces of acceleration or deceleration. Such systems commonly incorporate sensors to detect acceleration or deceleration forces. Typically, the sensors are electrically connected to a system of valves in nigh pressure tanks to inflate the bladoers at the appropriate instant. These systems tend to be inordinately complex and rely on the proper functioning of various mechanical, hydraulic or electrical components. A malfunction of any of these components may result in failure of the entire system; thus a malfunction of any of these components may result in a loss of all to restraining action. It must also be noted that the pilot must be flat up against the back of the seat in order for the restraining system to operate properly and to avoid injury to the pilot in the event of sudden acceleration or deceleration. The pilot is not able to turn in the seat or bend forward and still be able to rely on this particular type of restraining system to provide him safety. Thus, the pilot must be in a particular position relative to the seat in order for the restraining system to be effective.

Other prior art systems may provide lateral support pads on the seat back at a location just under the armpits of the occupant. These lateral support pads may have a wedge shape to conform to the contours of the human body. However, because of the wedge shape, the pads are best able to restrain the occupant from forces acting in a direction perpendicular to the inner surface of the pad. However, although the lateral pads are most effective at this angle perpendicular to the pad, lateral forces may instead act on the occupant at an angle which is oblique to but not perpendicular to the pad. Thus, severe lateral forces may tend to make the occupant slide off the lateral support pad. If, instead, there is a strap mounted between the forwardmost corner of one pad and the forwardmost corner of the other pad, the occupant may be adequately restrained between the pads, and the occupant will not slide off the lateral support pad; instead, the lateral force may tend to push the occupant's body into the connection point between the lateral support pad and the strap. Unfortunately, this is the point at which there is the least amount of padding at the lateral support pad. Moreover, since the pads are not adjustably mounted on the seat, in order to be properly effective these pads must be custom fitted to each particular pilot. In addition, this type of prior art system does not allow the occupant mobility; rather, the occupant must bend forward or turn around at the expense of losing the benefits of the system as a safety restraint.

Other prior art systems use a loop made up of two straps to restrain the torso of an occupant of a seat. The straps are connected together by means of a ring, and one strap extends out of a slit in the loop. One strap extends from the ring to the back of the seat and the other strap extends out of the aperture in the loop to the back of the seat at the other side. Both straps may either be connected together behind the seat or may be connected to appropriate anchoring positions on both sides of the seat. Turning movements of the occupant will cause one of the straps to be pulled out of the ring and the other strap to be pushed into the aperture, or vice versa. It is important to note that either strap may bind upon being pulled out of the ring or upon being pushed into the aperture. A disadvantage of this system is that this binding may cause the loop to become enlarged or constricted or may prevent further turning movements of the occupant. Thus, the operation of this system is not smooth and may instead hamper the turning movements of the occupant. Moreover, with this type of system, the occupant is not able to bend forward in the seat.

Another prior art system incorporates a pair of laterally positioned panels. These panels are rigid and are placed adjacent lateral portions of the occupant's torso. The seat thereby takes on a generally U-shape. The width of the lateral panels may be adjustable. However, the occupant is typically not completely restrained within the seat because the panels are required to project outwardly from the seat and do not envelop the occupant's torso. There are also no restraining elements preventing forward movement of the occupant in the seat. Thus, although the occupant is able to turn and bend forward in this type of prior art system, he is not adequately restrained from forces acting in the direction of the aircraft. Thus, although this type of prior art system provides mobility to the occupant, it does not provide proper restraint from forces acting in 2 or 3 dimensions. As with some of the other systems discussed hereinabove, this system has the disadvantage that the pilot must be flat against the seat back in order to prevent bruising or other injury to the occupant resulting from lateral forces of acceleration or deceleration.

Other prior art systems provide a limited degree of restraint against lateral forces through the use of shoulder straps. However, the use of shoulder straps also reduces the mobility of the occupant within the seat. Thus, the occupant is not able to turn or bend forward in the seat. It is also crucial to note that restraint against lateral forces is provided at the neck of the occupant. Upon the application of severe lateral forces of acceleration or deceleration, this restraint system will transmit these forces to the neck. Consequently, the disadvantage with this type of system is that the application of these forces to the neck can result in severe stresses being placed on the neck of the occupant. These forces can cause serious damage to the neck of the occupant. Therefore, a disadvantage of this type of system is that it can result in serious injury to the occupant. For a more complete analysis of fighter pilot shoulder restraint systems with particular emphasis on lateral restraint requirements, see the report by Van Patten, R. C., et al,: "Evaluation of AFTI/F-16 Restraint Concepts in the $\pm 2y$ Environment," Air Force Aerospace Medical Research Laboratory, AFAMRL-TR-807130, Wright Patterson Air force Base, Ohio, October 1980.

Another prior art restraint device uses acceleration sensors to activate a system to restrain the occupant upon sensing forces of acceleration or deceleration which exceed a threshold value. One disadvantage with these systems is that upon detection of severe forces these straps are merely locked in position at the instant at which the forces are sensed. However, at the time of a crash, the occupant may not be in the proper position in the seat to provide maximum or even adequate restraint. In addition, this type of prior art system is typically rather complex and therefore has many component parts which are each capable of malfunction. Consequently, this system is inherently more unreliable than less complicated systems.

A restraint system is thus needed that will provide restraint against lateral as well as forward or backward forces of acceleration and deceleration while still affording the occupant translational and rotational mobility within the seat.

SUMMARY OF THE INVENTION

It is a principal object of the present invention to provide restraint to the seat occupant against lateral forces of acceleration or deceleration as well as forces of acceleration or deceleration acting both in the direction opposite to the direction of flight of the aircraft and perpendicular to the wings.

It is an object of the present invention to provide mobility to the seat occupant without detracting from the effectiveness of the restraint system.

It is another object of the invention to provide a restraint system which is simple in construction and relatively fail safe.

It is also another object of the invention to provide a system which applies the restraint directly to the rib cage of the occupant rather than to the shoulders or neck in order to prevent excessive stress on the spine of the occupant.

It is also an object of the invention to provide a restraint system which will accommodate occupants of a variety of sizes.

It is another object of the invention to provide a restraint system wnich applies restraint directly to a relatively large area of the occupant's torso.

The system of the present invention is specifically designed to provide torso support from severe lateral inertial forces. The system must be used with a seat back which is compatible with the particular structure of the invention. However, in another embodiment of the system, the restraint system is designed for use with a seat having a parachute harness.

Generally, the invention consists of a U-shaped member attached to the seat back by a system of crisscrossing straps and tension straps. Another system of support straps are connected to the ends of the U-shaped member and form partially superimposed loops therebetween. The occupant's torso is encircled by these loops and secured therein. These support straps are arranged to communicate with the U-shaped member at a slip ring so that a turning movement of the occupant's torso within the loop will cause the straps to move through the slip ring. However, movement of the occupant within the loop does not detract from the ability of the system to provide lateral restraint to the occupant. Thus, the position of th occupant relative to the seat back is independent of the lateral restraint afforded.

The straps connecting the U-shaped member to the seat back are attached to an inertially locked spring retracting reel at each opposite side of the seat back and are connected in a crisscross relationship to the opposing end of the U-shaped member. This crisscross interconnection allows the U-shaped member to move forward and backward relative to the back of the seat and to turn by pivoting at the connection point at one end of the U-shaped member. The structure of the system thus adds greatly to the mobility of the occupant. This enables the occupant to turn around and to bend forward or backward in order to view enemy aircraft, weather conditions, etc. Moreover, the system enhances the occupant's ability to turn around and bend forward while still retaining the safety features of the restraint system.

Each of a pair of tension straps are connected to one of the inertial reels and to the end of the U-shaped member directly in front of the reel to which the strap is connected. These tension straps and inertial reels provide restraint from forces of acceleration acting in both front and back and to a certain extent in lateral directions. The inertial reels lock the tension straps in position in response to forces of acceleration acting in the lateral and backward directions. Consequently, the tension straps also prevent rotation of the U-shaped member in response to lateral forces of acceleration. Moreover, the inertial reels allow rotation of the U-shaped member in response to turning movement of the crewmember.

Generally, the second embodiment of the invention consists of a pair of straps and web members which form a pair of loops encircling a crewmember's rib cage. One end of each of the straps and one end of each of the web members are preferably interconnected at the front of the crewmember's rib cage. One of the web members covers the right side of the crewmember's rib cage and the other web member covers the left side of the crewmember's rib cage. Each loop passes through one of a pair of slip rings at each lateral side of the loops. Each slip ring is attached to one of a pair of securing straps which are connected to the inertial reels. The securing straps pass over a pair of support pads which are mounted on the seat back and which extend to a point adjacent to and laterally outward from the lateral portions of the loop straps. Thus, essentially each of the loops is laterally anchored to one of a pair of support pads mounted at a front side of the seat back. The securing straps thus are positioned to restrain lateral movement of the loops encircling the crewmember's torso thereby providing restraint against forces of acceleration acting in a lateral direction. However, movement of the occupant within the loop does not detract from the ability of the system to provide lateral restraint to the occupant. Therefore, the position of the occupant relative to the seat back is independent of the lateral restraint afforded.

The system is relatively simple; it has no hydraulic or electrical components. This simplicity provides reliability to the system and reduces the likelihood of complete failure or serious malfunction of the restraint system.

In the first embodiment of the invention, a preferably hemicylindrical pad is provided between each lateral portion of the loop and the torso of the occupant. These pads restrain the acceleration or deceleration forces and apply the restraint over a relatively large area of the torso providing increased comfort to the occupant and enhancing the absorption of severe lateral forces of acceleration or deceleration. However, in the second embodiment of the invention, relatively wide web members are provided instead of hemicylindrical pads. Moreover, the restraint is applied directly to the rib cage rather than the shoulders. The rib cage is better able to absorb these forces than the cervix. The system thereby prevents unnecessary stresses and strains to the cervix. Thus, the system is safer than other prior art systems and is also capable of absorbing higher forces of acceleration or deceleration than other prior art systems.

DETAILED DESCRIPTION OF THE PREFERRED EMBODIMENTS

Figure 1:
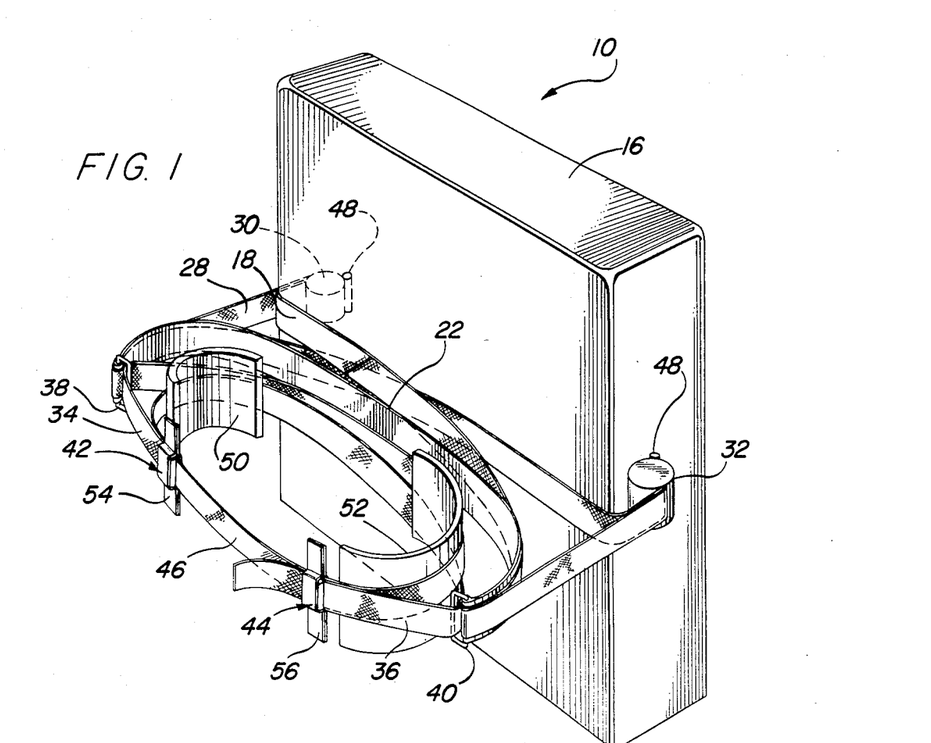
FIG. 1 is a perspective view of the lateral restraint system shown mounted on a conventional seat back.
Figure 2:
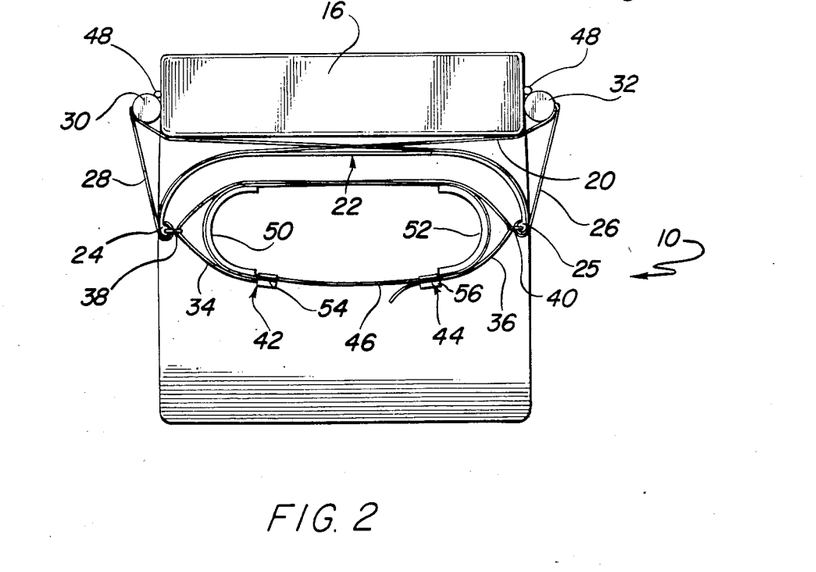
FIG. 2 is a top view of the restraint system more clearly showing the crossover strap arrangement.
Figure 3:
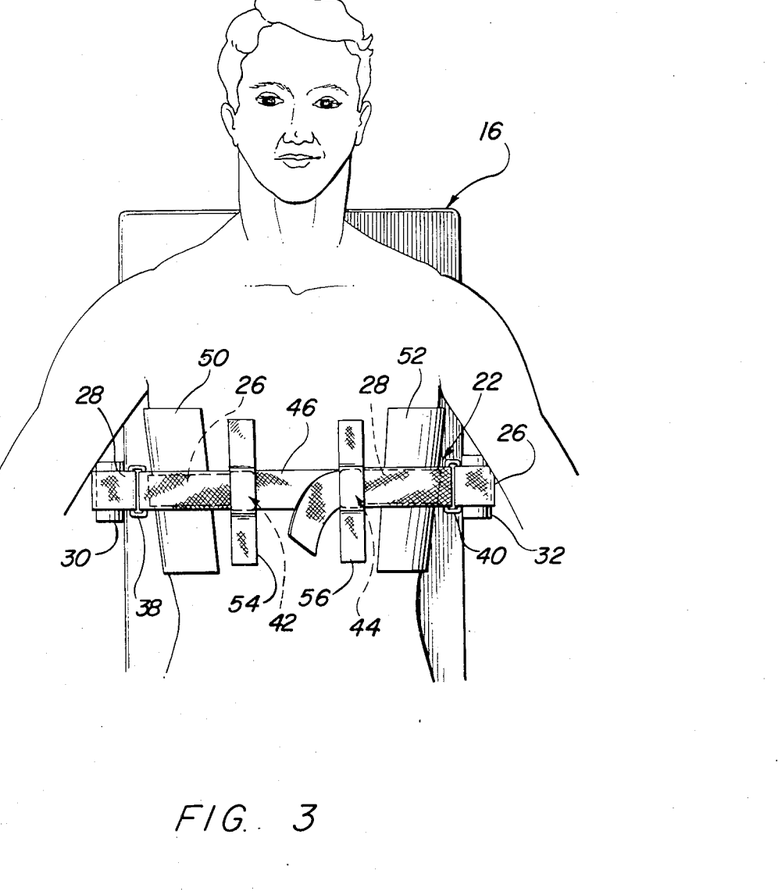
FIG. 3 illustrates the lateral restraint system providing support to the occupant of the seat.
Figure 4:
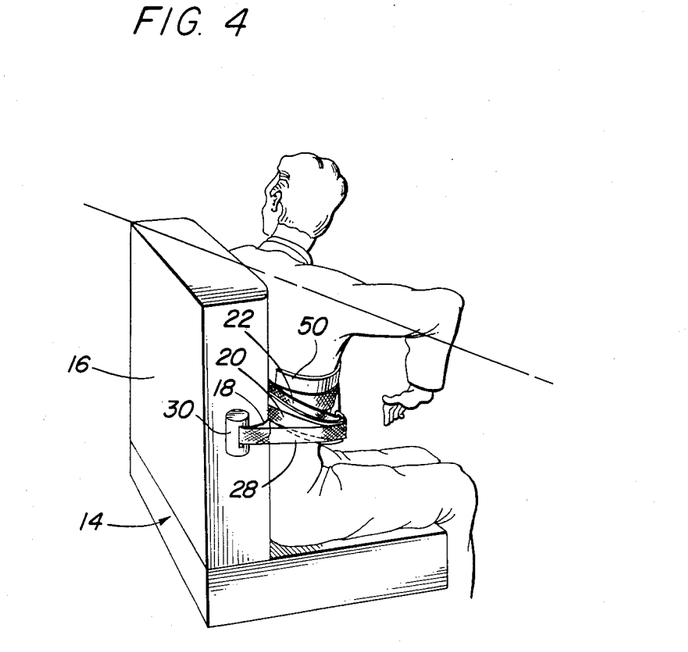
FIG. 4 is a perspective view of the lateral restraint system illustrating the occupant's ability to turn while still restrained by the system.
Figure 5:
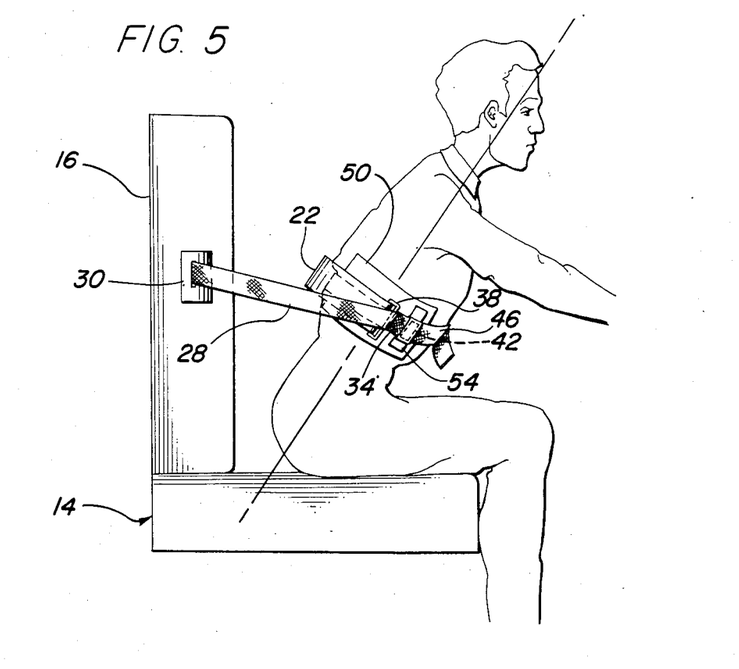
FIG. 5 is a perspective side view of the lateral restraint system illustrating the occupant's ability to lean forward while still restrained by the system.

Referring now to the drawings, FIGS. 1, 2 and 3 illustrate the lateral restraint system of the present invention. FIGS. 4 and 5 show a seated pilot restrained by the system of the present invention.

The restraint system of the present invention is generally designated by the numeral 10. The seated pilot or crewmember restraineo by the system 10 is generally designated by the numeral 12.

The restraint system 10 is shown mounted on a conventional seat 14; seat 14 is of the type which is typically used in modern fighter aircraft. Seat 14 has a seat back 16. A pair of straps 18 and 20 are secured to the seat back or backrest 16 preferably at each side of seat back 16. Straps 18 and 20 may be directly connected either to the sides of seat back 16 or preferably to a pair of inertial reels 30 and 32 (described in detail hereinbelow) mounted at the sides of seat back 16. The other ends of straps 18 and 20 are connected to each lateral end of a rigid U-shaped member 22 which is positioned in front of seat back 16.

As seen in FIG. 2, U-shaped member 22 is constructed to partially encircle the torso of the pilot 12. The ends 24 and 25 of U-shaped member 22 are in approximate lateral alignment with the medial portion of the lateral sides of the pilot's torso. As can be seen from FIGS. 1, 2 and 4, U-shaped member 22 is able to rotate to a limited degree in either lateral direction. Member 22 is also provided with a limited degree of movement in the forward and backward directions. U-shaped member 22 has this limited degree of movement because of the crisscross arrangement of straps 18 and 20. In addition, the crisscross arrangement allows a limited degree of rotation of member 22 relative to the seat 14.

Another pair of tension straps 26 and 28 are mounted directly between the sides of the seat back 16 and the ends 24 and 25 of the U-shaped member 22. Tension straps 26 and 28 do not crisscross. A pair of inertial reels 30 and 32 are mounted on the sides of the seat back 16. Inertial reels 30 and 32 receive tension straps 26 and 28 as well as straps 18 and 20. However, alternatively, two separate pairs of reels may also be used for the two pairs of straps 18 and 20 and 26 and 28. Inertial reels 30 and 32 may also be a single inertial reel or tensioner 30, appropriately positioned on the seat 14. Inertial reels 30 and 32 respond to forces of acceleration or deceleration acting in the front, back and lateral directions thereby locking straps 18, 20, 26, and 28 in position upon deceleration in any of these directions. Consequently, reels 30 and 32 provide restraint to member 22 and to pilot 12 from forces of deceleration acting in the forward direction. In addition, reels 30 and 32 by locking straps 26 and 28 in position thereby prevent U-shaped member 22 and pilot 12 from rotating relative to seat back 16 in response to lateral forces of acceleration or deceleration and to other forces of acceleration or deceleration having lateral components.

Support straps 34 and 36 each preferably partially encircle the pilot's torso. Left support strap 34 passes over the left side of the pilot and passes around the back of the pilot's torso to the right lateral end 24 of the U-shaped member 22; strap 34 is connected to the right lateral end 24 of U-shaped member 22 by means of a slip ring 38. The right support strap or loop 36 passes over the right side of the torso of the pilot 12 and the back of the pilot's torso; strap 36 is connected to the left lateral end 25 of the U-shaped member 22. The right support strap 36 passes through a slip ring 40 at the left lateral end 25 of the U-shaped member 22. A latch 42 connects the right support strap loop 36 to the left support strap loop 34. Similarly, an adjuster 44 connects the right support strap loop 36 to the left support strap loop 34 at the front of the pilot's torso. A common strap 46 is mounted between the latch 42 and adjuster 44. The latch 42 and adjuster 44 interconnect straps 34 and 36 and common strap 46 so as to form two loops which are partially superimposed on each other and which preferably each completely encircle the torso of the pilot 12. The loops thus snare a common portion (i.e., common strap 46). The adjuster 44 adjusts the size of the loops thereby constricting or enlarging the loops and thereby accommodating the loops to the circumference of the torso of the user. The latch 42 also provides a quick release disengagement of the system 10 from the pilot 12 by disconnecting the support straps 34 and 36 from the common strap 46.

When the pilot 12 is adequately secured to the seat by means of the straps 34 and 36, rotation of the pilot's torso to the right results in the strap 34 passing through the slip ring 38. However, movement in this direction is limited by the position of the latch 42. Strap 34 comes to the end of its travel when slip ring 38 abuts the latch 42. Similarly, rotation of the pilot's torso towards the left is allowed by the system 10 because slip ring 40 allows passage of strap 36 therethrough. The end of travel of the strap 36 through slip ring 40 is determined by the position of the adjuster 44. When the adjuster 44 abuts the slip ring 40, the pilot's torso cannot rotate within the U-shaped member 22.

Release or disconnect pins 48 are provided in the sides of the seat back 16 for releasable securement of the reels 30 and 32 thereto. The release pin 48 may be simply pulled out of the seat back 16 thereby releasing the reels 30 and 32 from the seat 14 resulting in separation of the U-shaped member 22, the straps 34 and 36, and reels 30 and 32 from the seat back 16. This may be required in order for the pilot or crew member 12 to safely evacuate the aircraft in the event of an emergency.

For comfort and support, hemicylindrical support pads 50 are mounted between the pilot's torso and support straps 34 and 36. Pads 50 and 52 may be sewn onto straps 34 and 36 or merely positioned between the straps 34 and 36 and the pilot's torso. The hemicylindrical pads 50 and 52 also act to spread the lateral forces of acceleration or deceleration over a larger area of the lateral sides of the pilot's torso. The pads 50 and 52 thus reduce the likelihood of injury to the pilot's torso as a result of the pilot 12 being subjected to sudden lateral forces of a high magnitude.

There are also vertical straps 54 and 56 which secure straps 34 and 36 to the pilot's clothing or parachute to prevent the straps 34 and 36 from sliding down the pilot's torso. Straps 54 and 56 preferably cover the latch 42 and adjuster 44 and have velcro pads which secure to corresponding pads on the harness or clothing.

As is evident from the foregoing, the system 10 provides the pilot with lateral support as well as support in the forward and backward directions. The system 10 also allows the pilot 12 to bend forward with the U-shaped member 22 because of the crisscrossing configuration of the straps 18 and 20 and reels 30 and 32. The crisscrossing straps 18 and 20 and tension straps 26 and 28 preferably unwinding from reels 30 and 32 also allow rotation of the U-shaped member 22 in either direction. Thus, the occupant can lean back pushing member 22 into contact with seat back 16 while still allowing the occupant to turn, rotating member 22 relative to seat back 16.

Figure 6:
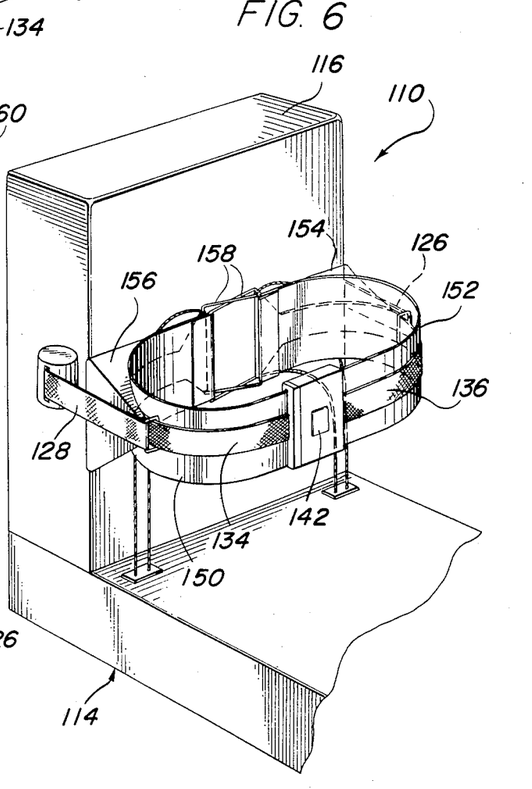
FIG. 6 is a perspective view of a second embodiment of the lateral restraint system shown mounted on a conventional seat back.
Figure 7:
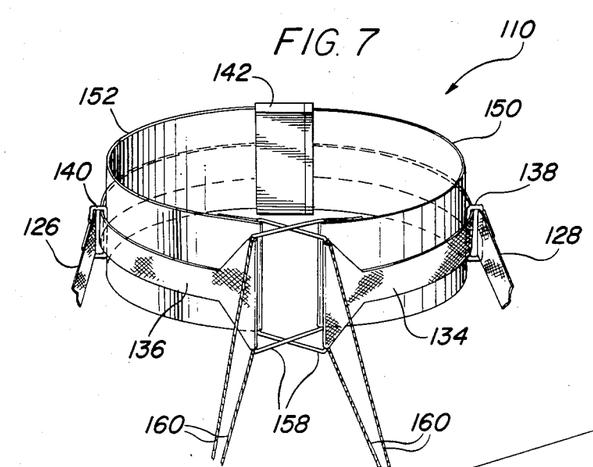
FIG. 7 is a perspective view of the second embodiment of the lateral restraint system with the seat back removed for clarity of illustration.

Another embodiment 110 of the invention utilizes a pair of straps 134 and 136. Each of the pair of straps 134 and 136 is provided with web members 150 and 152 which each encircle a lateral side of the pilot's torso and extend around the back of the pilot's torso through a slip ring 138 at the opposite end of the seat 116. The strap 134 may pass freely through the slip ring 138 thereby allowing rotation of the pilot's torso in the seat 116. The latch 142 connects the web member 152 to the strap 134 thereby forming a loop. Latch 142 also allows quick release of the strap system 110 from the pilot's torso allowing ingress and egress to or from the seat 116.

Figure 8:
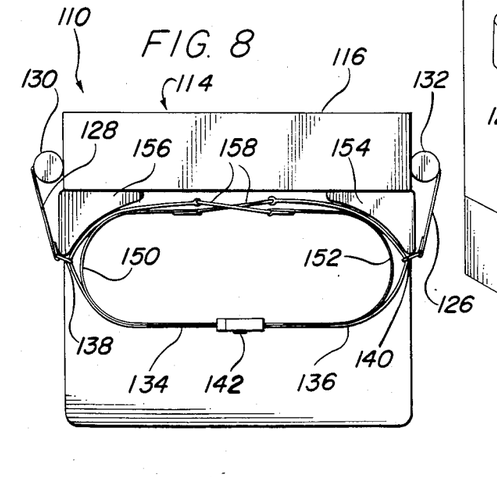
FIG. 8 is a top view of the restraint system of FIGS. 6 and 7.

Strap 136 similarly passes through slip ring 140 which is preferably mounted at the other end of the seat 116. Latch 142 connects web member 152 to an end of strap 134. Each of the slip rings 138 and 140 is connected to a side portion of the seat 116 by means of a tension strap 126 or 128 and an inertial reel 130 or 132. However, one appropriately positioned inertial reel or tensioner 130 may be used rather than a pair of inertial reels 130 and 132. The inertial reel or tensioning device 130 or 132 provide restraint to loops 118 and 136 and maintain tension straps 126 and 128 under tension. The reels 130 and 132 are preferably of the type which feed out the tension straps 126 and 128 therefrom and thereby allow the strap loops to be pulled from the seat back 116. The tensioning devices 130 and 132 thus provide restraint from lateral forces of acceleration and deceleration as well as restraint from forces of acceleration and deceleration acting in the direction of and opposite to the direction of flight of the aircraft.

Figure 9:
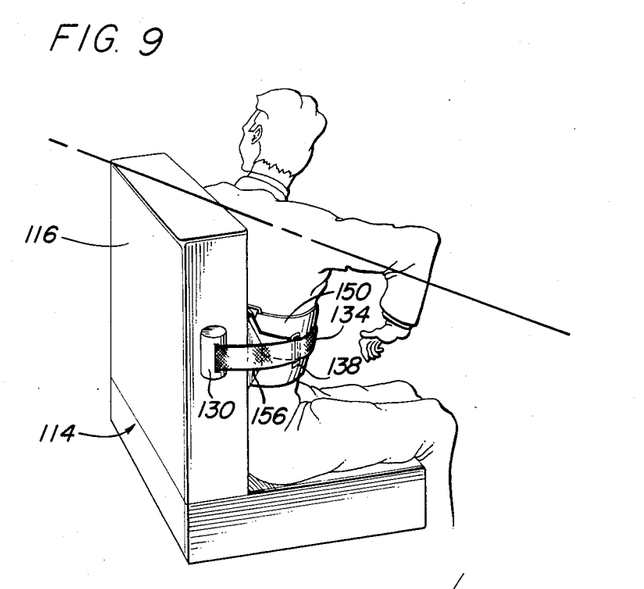
FIG. 9 is a perspective view of the second embodiment of the lateral restraint system illustrating the occupant's ability to turn while still restrained by the system.
Figure 10:
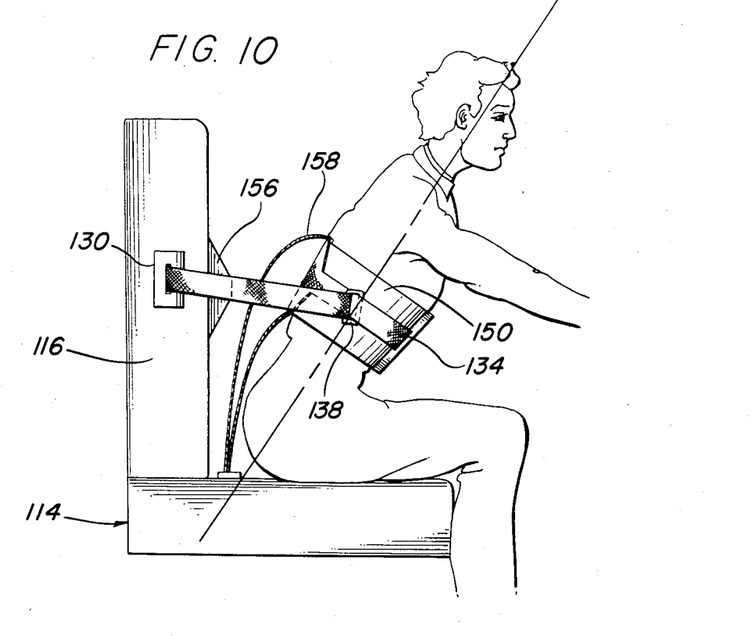
FIG. 10 is a perspective side view of the second embodiment of the lateral restraint system illustrating the occupant's ability to lean forward while still restrained by the system.

This embodiment 110 is particularly well adapted for integration with a parachute harness because this embodiment 110 does not utilize crisscrossing straps or a U-shaped member. Embodiment 110 is also preferably provided with cables 158 which are preferably connected at the interconnections between the straps 134 ano 136 and the web members 150 and 152. Cables 158 have sheaths 160 which are secured to the lateral edge of the straps 134 and 136. One end of each of the cables 158 is secured to the lateral edge of the web members 150 and 152. The lateral edges of the straps 134 and 136 and the lateral edges of web members 150 and 152 are preferably rigid in order that the sheaths may be properly braced against the straps and anchored to the web members 150 and 152 to push together or pull apart the straps 134 and 136 and web members 150 and 152. The cables 15u provide an automatic adjustment to the straps 134 and 136 and web members 150 and 152 to accommodate the size of the pilot. Since embodiment 110 does not use a U-shaped member as in embodiment 10, the pilot's arms may freely hang downward without obstruction by the U-shaped member. When a lateral force is acting in one direction, one of the tension straps 126 or 128 and one of the inertial reels 130 or 132 will act to restrain the pilot from movement in the direction of that lateral force. Similarly, when a lateral force is acting in the opposite direction, the other tensioning device opposes movement of the pilot in the direction of that force.

Lateral pads 154 and 156 are mounted on the lateral face portions of seat back 116. Pads 154 and 156 are preferably wedge shaped and extend forward from the seat back 116. Pads 154 and 156 narrow as they extend forward from the seat back 116. Tension straps 126 and 128 pass over the narrowest portions forming support points or anchor points for straps 126 and 128 from forces acting in the lateral directions.

Release or disconnect pins 148 may also be provided as in the first embodiment. In addition, one or more pyrotechnic devices (not shown) may be provided to quickly sever the cables 158 from the seat 14 in order to quickly separate the rest of the restraint system 110 therefrom in the event of an emergency.

Accordingly, there has been provided, in accordance with the invention, a torso restraint system that fully satisfies the objectives set forth above. It is to be understood that all terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications and variations that fall within the spirit and the scope of the invention as set forth in the claims hereinbelow.

I claim:

1. A torso restraint system for protecting the torso of a crewmember from inertial forces while the crewmember is in a seat within a vehicle, comprising:
    a support member having lateral sides, said support member being positioned forward of the seat, the lateral sides of said support member being in approximate lateral alignment with lateral side portions of the crewmember's upper torso, said support member having a limited degree of movement relative to the seat in the lateral and forward and backward directions;
    a pair of tension straps, one of said pair connected to one lateral side of said support member, and the other of said pair connected to the other lateral side of said support member;
    a tensioner connecting said pair of tension straps to the seat, said tensioner maintaining said pair of straps under tension, said tensioner allowing said support member a limited degree of movement relative to the seat in the lateral, and forward and backward directions, said tensioner locking said pair of straps in position in response to forces of vehicle acceleration in the lateral and backward directions;
    a left support strap connected to said support member, said left support strap contacting the left lateral side of the torso of the crewmember, said left support strap forming a first loop at least partially encircling the torso of the crewmember and extending laterally across the torso and under the arms of the crewmember, said first loop being rotatable relative to said support member;
    a right support strap connected to said support member, said right support strap contacting the right lateral side of the torso of the crewmember, said right support strap forming a second loop at least partially encircling the torso of the crewmember and extending laterally across the torso and under the arms of the crewmember, said second loop being rotatable relative to said support member;
    means for releasably securing said left support strap and said right support strap around the torso the crewmember.

2. The system of claim 1 further including:

a right support pad mounted between said right support strap and the right lateral side of the torso of the crewmember; and a left support pad mounted between said left support strap and the left lateral side of the torso of the crewmember.

3. The system of claim 2 wherein said right support pad is approximately hemicylindrical to generally conform to the curvature of the torso of the crewmember so that the system can apply restraint from inertial forces directly over a larger area of the right side of the torso than said right support strap alone, and wherein said left support pad is approximately hemicylindrical to generally conform to the curvature of the torso of the crewmember so that the system can apply restraint from inertial forces directly over a larger area of the left side of the torso than said left suppurt strap alone.

4. The system of claim 1 wherein said support member is generally U-shaped.

5. The system of claim 1 wherein said means for releasably securing comprises a latch interconnecting said left strap and said right strap.

6. The system of in claim 1 further including:
a common support strap interconnecting said left strap and said rignt strap so that said first loop and said second loop share a common portion thereof, said first loop and said second loop encircling the torso of the crewmember; and
an adjuster mounted at an interconnection between said common strap and said left and rignt straps for providing adjustment of the circumference of said first loop and said second loop.

7. The system of claim 1 further including:
a first crisscrossing strap connecting one lateral side of the seat back to the opposing lateral side of said support member; and
a second crisscrossing strap connecting the other lateral side of the seat back to the other opposing side of said support member, said first crisscrossing strap and said second crisscrossing strap crisscrossing between the seat back and said support member at approximately a medial portion thereof said first crisscrossing strap and said second crisscrossing strap connected to said tensioner.

8. The system of claim 1 further including a pair of vertical straps connecting said left strap and said right strap to the torso of the crewmember for preventing said first loop and said second loop from slipping down the crewmember's torso.

9. The system of claim 1 further including a slip ring mounted on said support member at a lateral end thereof connecting said left strap to said support member, said slip ring allowing said left strap to pass freely therethrough.

10. The system of claim 1 further including a slip ring mounted on said support member at a lateral end thereof connecting said right strap to said support member, said slip ring allowing said right strap to pass freely therethrough.

11. The system of claim 1 further including a means for disconnecting said support member from the seat back.

12. The system of claim 11 wherein said means for disconnecting comprise a pair of pins mounted in the seat back at points of connection of said support member to the seat back.

13. An apparatus for protecting the torso of a crewmember from inertial forces while said crewmember is in a seat within a vehicle and which may be used in conjunction with a parachute harness, comprising:

a left support strap;
a left web member connected to said left support strap and forming a first loop therewith encircling the torso of the crewmember, said first loop capable of rotation relative to the seat, said left web member contacting the left lateral side of the torso of the crewmember;
a right support strap;
a right web member connected to said right support strap and forming a second loop therewith encircling the torso of the crewmember, said second loop capable of rotation relative to the seat, said right web member contacting the right lateral side of the torso of the crewmember;
a right vertical strap connecting said right support strap to the torso of the crewmember for preventing said second loop from slipping down the crewmember's torso;
a left vertical strap connecting said left support strap to the torso of the crewmember for preventing said first loop from slipping down the crewmember's torso;
a right inertial reel having a right tension strap, said right reel detachably mounted on the seat at the rignt side thereof;
a left inertial reel having a left tension strap, said left reel detachably mounted on the seat at a left side thereof;
means for rotatably connecting said left tension strap to said first loop so that said first loop can rotate relative to said left inertial reel;
means for rotatably connecting said right tension strap to saio second loop so that said second loop can rotate relative to said right inertial reel;
a right lateral pad mounted at a right lateral front portion of the seat back, said right pad having a portion projecting forward of the seat back, said right tension strap passing over said portion projecting forward;
a left lateral pad mounted at a left lateral front portion of the seat back, said left pad having a portion projecting forward of the seat back, said left tension strap passing over said portion projecting forward.

14. An apparatus as in claim 13 wherein said means for connecting said right tension strap and said means for connecting said left tension strap comprise a pair of slip rings, one of said pair mounted on said right tension strap and receiving said left support strap and the other of said pair mounted on said left tension strap and receiving said right support strap.

15. An apparatus as in claim 13 wherein said left web member is releasably connected to said left support strap allowing the crewmember ingress to and egress from the apparatus.

16. An apparatus as in claim 13 wherein said right web member is releasably connected to said rignt support strap allowing the crewmember ingress to and egress from the apparatus.

17. An apparatus as in claim 13 further including a means for adjusting the circumferential size of said right loop and the circumferential size of said left loop.

18. An apparatus as in claim 17 wnerein said means for adjusting the circumferential size of said right loop and said left loop is releasably connected to said right support strap and said left support strap.

19. An apparatus as in claim 18 wherein said means comprises a pyrotechnic quick release means connected to said means for adjusting the right loop and connected to said means for adjusting the left loop for releasing said means for ajusting the right and left loops from the seat so that the crewmember can release the apparatus from the seat in an emergency.

20. An apparatus for protecting the torso of a crewmember from inertial forces while said crewmember is in a seat within a vehicle, comprising:
   an approximately U-shaped support member;
   a pair of inertial reels, one of said pair of inertial reels mounted on a right lateral side portion of the backrest of the seat and having a rignt tension strap connected to a right lateral end of said U-shaped support member, said right tension strap retracting into and feeding out from said one of said pair of inertial reels so that said right end of said support member has a limited degree of movement relative to the backrest in the lateral, forward and backward directions, the other of said pair of inertial reels mounted on a left lateral side portion of the backrest of the seat and having a left tension strap connected to a left lateral end of said U-shaped support member, said left tension strap retracting into and feeding out from said other of said pair of inertial reels so that said left end of said support member has a limited degree of movement relative to the backrest in the lateral, forward and backward directions;
   a first crisscrossing strap connecting one of said pair of inertial reels to an opposite end of said support member;
   a second crisscrossing strap connecting the other of said pair of inertial reels to the other opposite end of said support member so that said first crisscrossing strap and said second crisscrossing strap crisscross behind said U-shaped member, said first and said second crisscrossing straps having sufficient retraction into and feeding out from said pair of inertial reels so that said support member has a limited degree of movement relative to the backrest in the lateral, forward and backward directions, said first and second crisscrossing straps being kept under constant tension by said pair of inertial reels;
   a left slip ring mounted at one end of said support member;
   a left support strap passing through said left slip ring,
   a right slip ring mounted at the other end of said support member
   a right support strap passing through said right slip ring;
   a common strap positioned approximately in front of the chest of the crewmember and connecting said right support strap to said left support strap;
   a latch means for releasably connecting one end of said left support strap and one end of said right support strap to one end of said common strap to form a pair of loops encircling the torso of the crewmember, said pair of loops comprising a first loop and a second loop, said first loop having a portion which is adjacent to the left side and back side of the crewmember's torso, said second loop having a portion which is adjacent to the right side and back side of the crewmember's torso;
   an adjuster connecting the other end of said common strap to the other ends of said left and right straps for adjusting the circumferential sizes of said first loop and said second loop;
   an approximately hemicylindrically shaped right support pad mounted between said second loop and the right lateral side of the torso of the crewmember;
   an approximately hemicylindrically shaped left support pad mounted between said first loop and the left lateral side of the torso of the crewmember;
   a first release pin mounted in the backrest for releasing said right inertial reel from the backrest to assist release of the apparatus from the seat in the event of an emergency;
   a second release pin mounted in the backrest for releasing said left inertial reel from the backrest to assist release of the apparatus from the seat in the event of an emergency.

* * * * *